United States Patent [19]

Iwu

[11] 3,985,567

[45] Oct. 12, 1976

[54] METHOD OF TREATING BAUXITE WASTE RED MUD WITH ACID AND MAKING CONSTRUCTION BRICKS FROM THE TREATED MATERIAL

[75] Inventor: Gregory Onyemauwa Iwu, Georgetown, Guyana

[73] Assignee: University of Guyana, Georgetown, Guyana; a part interest

[22] Filed: Sept. 18, 1974

[21] Appl. No.: 507,089

[52] U.S. Cl. .................... 106/73.6; 106/65; 423/111; 423/132; 423/202
[51] Int. Cl.² .................................. C04B 35/00
[58] Field of Search ............... 106/67, 65, 73.6; 423/111, 132, 131, 121, 136

[56] References Cited
UNITED STATES PATENTS

| 1,439,286 | 12/1922 | Beecher | 106/67 |
| 1,769,297 | 7/1930 | Lambie | 106/67 |
| 1,796,107 | 3/1931 | Jonas et al. | 423/132 |
| 2,021,221 | 11/1935 | Benner et al. | 106/67 |
| 3,295,924 | 1/1975 | Colombo | 423/121 |
| 3,876,749 | 4/1975 | Horváth et al. | 423/131 |
| 3,879,211 | 4/1975 | Klotz | 106/67 |

Primary Examiner—Patrick P. Garvin
Assistant Examiner—John P. Sheehan
Attorney, Agent, or Firm—Ladas, Parry, Von Gehr, Goldsmith & Deschamps

[57] ABSTRACT

Bauxite waste red mud is treated with hydrochloric acid to dissolve only the sodium content. The treated material is mixed with kaolinitic clay and formed into construction bricks.

3 Claims, No Drawings

METHOD OF TREATING BAUXITE WASTE RED MUD WITH ACID AND MAKING CONSTRUCTION BRICKS FROM THE TREATED MATERIAL

This invention relates to an improved method of treating bauxite waste red mud with acid to obtain material therefrom suitable for making construction bricks.

Bauxite waste red mud presents a storage problem when discharged into ponds and pollution hazards when discharged into rivers or vegetation on land. Hence the development of a technology that directly utilizes the red mud is of economic as well as ecological significance. The main mineral ingredients of the typical Guyana bauxite red mud (dry solid basis) are in per cent. $12Fe_2O_3$, $23SiO_2$, $31Al_2O_3$, $10TiO_2$ and $12Na_2O$. Hitherto, when bauxite waste red mud is treated with either sulphuric or hydrochloride acid solution it yields a solution containing the sulphates or the chlorides respectively, of iron, aluminum, titanium and sodium. According to the present invention sodium is selectively abstracted into solution from the red mud, as sodium chloride, without bringing down or contaminating the solution with the chlorides of iron, titanium, silicon and aluminum. A concentrate of this solution is brine which is the basic material for the electrolytic production of caustic soda. The residual red mud from the above, free from sodium, is used for the production of construction bricks. Hitherto, the relatively high per cent of soda in the bauxite waste red mud, has rendered the latter an unsuitable material for making construction bricks.

The method of the invention is illustrated by the following procedure. To 100 gms. of bauxite red mud, oven dried at 115° C., 500 c.c. of distilled water is added. The mixture is heated with vigorous and constant stirring to between 70°–80° C. Within this temperature range, a suspended titration is performed on the mixture using 1 molar solution of hydrochloric acid till the mixture attained a pH of between 5.5 and 6. To successfully carry out the suspended titration, the mixture must be continuously and vigorously stirred so as to have the particulates of the mixture in a continuous suspension. When the mixture has attained a pH of between 5.5–6, the titration is terminated, since only and all the sodium in the red mud is presumed to be in the solution. The mixture is left to cool. When the solid particles has settled down to the bottom of the reaction vessel as evidenced by a clear supernatant liquid, the latter is collected by decantation or filtration. The residue is washed with distilled water and the washings added to the filtrate. Washing of the residue is presumed complete when portions from the filtrate yield no crystals on evaporation to dryness. Four washings of the residue is usually sufficient. The filtrate on evaporation to dryness should yield on the average 12 gms. of solid sodium chloride from 100 gms. of bauxite waste red mud. The analysis of the solid is as follows: sodium chloride 96–97%; calcium chloride 1.5–2%; sulphur 0.8–1% and phosphorus 0.5–1%. When the solid is fused at 1000° C. and re-analyzed, it gives on the average 98–99% sodium chloride. Alternatively, if the filtrate is evaporated to a volume of about 40 c.c. the resulting concentrate is a brine solution which would on electrolysis yield caustic soda, chlorine and hydrogen.

The solid residue left after the extraction of the sodium content from the red mud, is dried and pulverized to its original powdery form, 80–90% by weight of this powder is mixed thoroughly with 20 to 10% by weight, respectively, of a kaolinitic clay. (The average chemical composition of the kaolinitic clay was as follows: 70% $SiO_2$; 18% $Al_2O_3$; 6% $Fe_2O_3$ and 1% $TiO_2$. The X-ray diffraction and DTA studies on the kaolinitic clay shows the presence of kaolinite, quartz and micacious minerals.)

The mixture is made workable with water and the resulting slurry compacted and introduced into a wooden mold ($3.7 \times 3.7 \times 3.7 \times 10^{-2m}$) lined with aborite. The mold is over-filled with the compacted mix, pressed down and levelled with a spatula. The bricks are air-dried for about 24 hours and then dried at 150° C. for about 3 days in a thermostat controlled oven, equipped with an exhaust fan. The bricks are fired in a thermostat controlled Linberg heavy duty furnace from 200° to 1140° C. at the rate of 50° increase per hour. The bricks are soaked at 1140° C. for 8 hours.

EXAMPLE 1

If 90% of the solid red mud residue mixed with 10% of the kaolinitic clay is made into a brick cube of ($3.7 \times 3.7 \times 3.7 \times 10^{-2m}$) and fired at 1140° C. and soaked at this temperature for 8 hours, a brick with the following physical properties is obtained:
 a. Compressive strength: $8 \times 10^7 Nm^{-2}$ (or 12,000 p.s.i.) and
 b. Water absorptions: 0.88% by weight.

EXAMPLE 2

With 80% of the solid red mud residue mixed with 20% kaolinitic clay a brick with the following physical properties is produced:
 a. Compressive strength: $7 \times 10^7 Nm^{-2}$ (or 10,000 p.s.i.) and
 b. Water absorption: 1.35% by weight.

I claim:
1. An improved method of treating bauxite waste red mud comprising $Fe_2O_3$, $SiO_2$, $Al_2O_3$, $TiO_2$ and $Na_2O$ with acid to remove sodium therefrom and to obtain commercially useful material therefrom, wherein, the improvement comprises:
 a. suspending said waste red mud which has been dried in water;
 b. titrating the suspension with a molar solution of hydrochloric acid corresponding to the sodium content of the red mud until the pH of the suspension is between 5.5–6;
 c. continuously agitating the suspension during titration;
 d. allowing the suspension to settle after titration;
 e. separating the liquid portion containing sodium chloride from the solid portion;
 f. washing said solid portion until portions of the filtrate from said washings yield substantially no crystals on evaporation to dryness;
 g. and converting said solid portion to a dry powder.
2. A method according to claim 1, which includes mixing the dry powder product with kaolinitic clay, placing the mixture in molds and firing the same to produce construction bricks.
3. Construction bricks formed according to the method of claim 2.

* * * * *